US012651401B2

(12) United States Patent (10) Patent No.: US 12,651,401 B2
Cabello (45) Date of Patent: Jun. 9, 2026

(54) METHODS AND APPARATUS FOR MULTI-SPATIAL GUIDED IMAGE RECONSTRUCTION

(71) Applicant: Siemens Medical Solutions USA, Inc., Malvern, PA (US)

(72) Inventor: Jorge Cabello, Lenoir City, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 358 days.

(21) Appl. No.: 18/492,113

(22) Filed: Oct. 23, 2023

(65) Prior Publication Data

US 2025/0131643 A1     Apr. 24, 2025

(51) Int. Cl.
G06T 15/08          (2011.01)
G06T 3/4053         (2024.01)
G06T 7/38           (2017.01)
(52) U.S. Cl.
CPC ............ G06T 15/08 (2013.01); G06T 3/4053 (2013.01); G06T 7/38 (2017.01); *G06T 2207/10088* (2013.01); *G06T 2207/10104* (2013.01); *G06T 2207/20081* (2013.01); *G06T 2207/20084* (2013.01); *G06T 2210/41* (2013.01); *G06T 2211/441* (2023.08); *G06T 2211/464* (2023.08)
(58) Field of Classification Search
CPC ......... G06T 15/08; G06T 3/4053; G06T 7/38; G06T 2207/10088; G06T 2207/10104; G06T 2207/20081; G06T 2207/20084; G06T 2210/41; G06T 2211/441; G06T 2211/464
See application file for complete search history.

(56) References Cited

U.S. PATENT DOCUMENTS

| | | | | |
|---|---|---|---|---|
| 11,854,126 | B2 * | 12/2023 | Schaefferkoetter | ....... G06T 3/14 |
| 2015/0065854 | A1 * | 3/2015 | Ahn | ..................... A61B 6/5247 |
| | | | | 600/411 |
| 2019/0066343 | A1 * | 2/2019 | Bogoni | .................. G06T 12/20 |
| 2020/0289077 | A1 * | 9/2020 | Bai | .......................... G06N 3/09 |
| 2021/0042913 | A1 * | 2/2021 | Takeshima | ............. G16H 30/20 |
| 2025/0191124 | A1 * | 6/2025 | Krishnan | .............. G06T 3/4046 |

OTHER PUBLICATIONS

Mehranian. Abolfazi et al., "Pet Image Reconstruction Using Multi-Panametric Anato-Functional Priors", Phys. Med. Biol. 62 (2017) 5975-6007.

* cited by examiner

*Primary Examiner* — Stephen R Koziol
*Assistant Examiner* — Michael Kim Maiden

(57) ABSTRACT

Systems and methods for reconstructing medical images are disclosed. Measurement data from positron emission tomography (PET) data, and measurement data from an anatomy modality, such as magnetic resonance (MR) data, is received from an image scanning system. A PET image is generated based on the PET measurement data, and a plurality of anatomy images are generated based on the anatomy measurement data. The plurality of anatomy images include voxels of differing spatial resolutions. A multi-spatial image reconstruction process is applied to the PET measurement data and the plurality of anatomy images. Based on the application of the image reconstruction process, image volume data characterizing a reconstructed medical image is generated. The reconstructed medical image may be displayed to a medical professional for diagnosis.

20 Claims, 8 Drawing Sheets

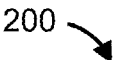
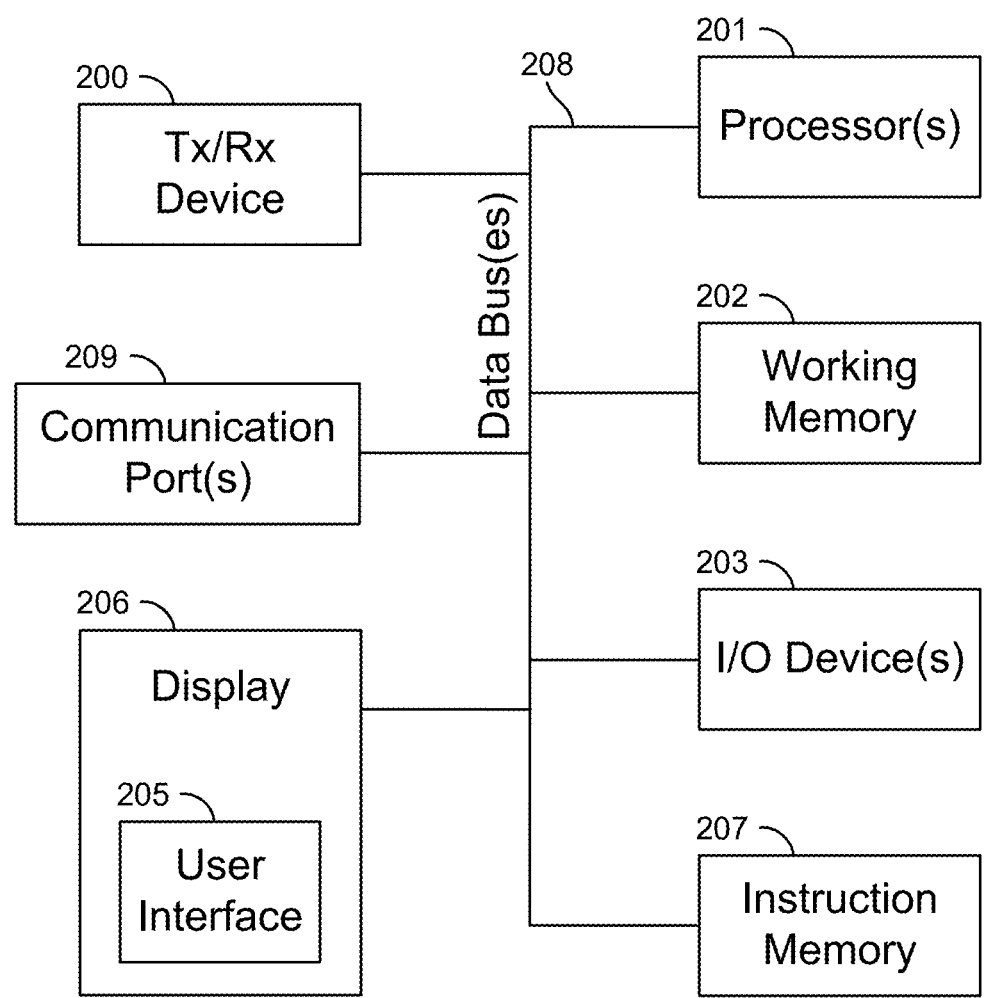
FIG. 2

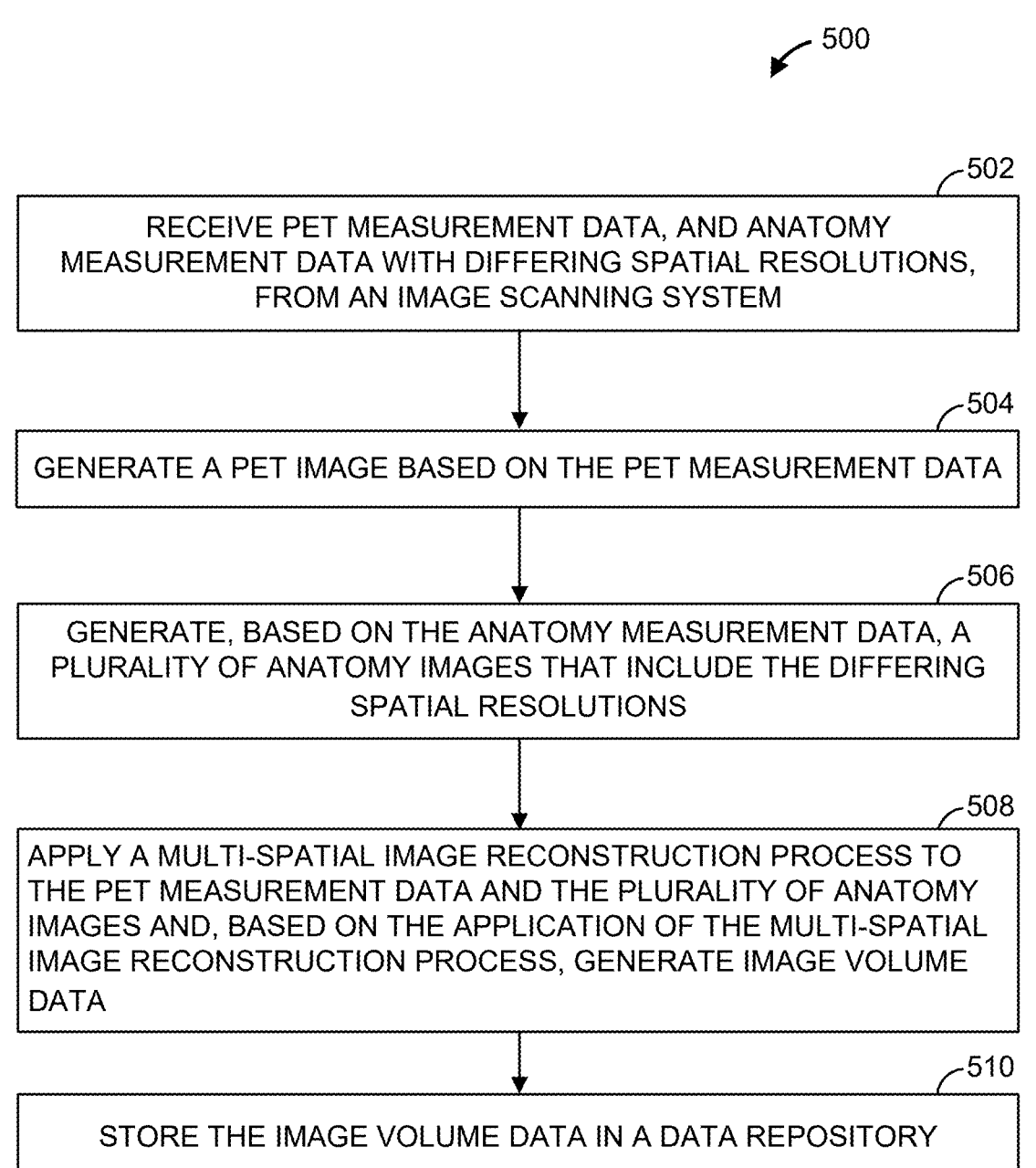

500

502

RECEIVE PET MEASUREMENT DATA, AND ANATOMY MEASUREMENT DATA WITH DIFFERING SPATIAL RESOLUTIONS, FROM AN IMAGE SCANNING SYSTEM

504

GENERATE A PET IMAGE BASED ON THE PET MEASUREMENT DATA

506

GENERATE, BASED ON THE ANATOMY MEASUREMENT DATA, A PLURALITY OF ANATOMY IMAGES THAT INCLUDE THE DIFFERING SPATIAL RESOLUTIONS

508

APPLY A MULTI-SPATIAL IMAGE RECONSTRUCTION PROCESS TO THE PET MEASUREMENT DATA AND THE PLURALITY OF ANATOMY IMAGES AND, BASED ON THE APPLICATION OF THE MULTI-SPATIAL IMAGE RECONSTRUCTION PROCESS, GENERATE IMAGE VOLUME DATA

510

STORE THE IMAGE VOLUME DATA IN A DATA REPOSITORY

FIG. 5

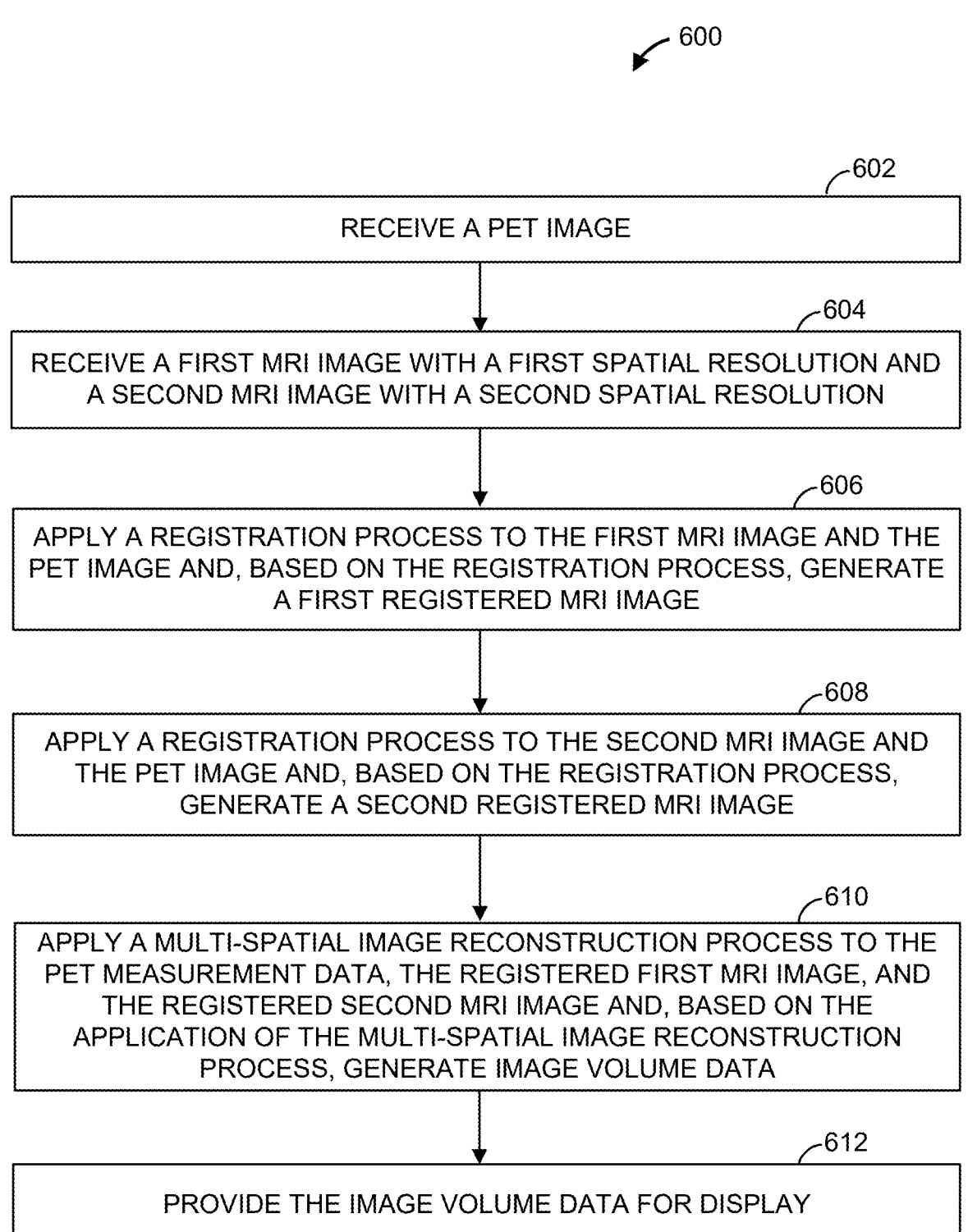

600

602
RECEIVE A PET IMAGE

604
RECEIVE A FIRST MRI IMAGE WITH A FIRST SPATIAL RESOLUTION AND A SECOND MRI IMAGE WITH A SECOND SPATIAL RESOLUTION

606
APPLY A REGISTRATION PROCESS TO THE FIRST MRI IMAGE AND THE PET IMAGE AND, BASED ON THE REGISTRATION PROCESS, GENERATE A FIRST REGISTERED MRI IMAGE

608
APPLY A REGISTRATION PROCESS TO THE SECOND MRI IMAGE AND THE PET IMAGE AND, BASED ON THE REGISTRATION PROCESS, GENERATE A SECOND REGISTERED MRI IMAGE

610
APPLY A MULTI-SPATIAL IMAGE RECONSTRUCTION PROCESS TO THE PET MEASUREMENT DATA, THE REGISTERED FIRST MRI IMAGE, AND THE REGISTERED SECOND MRI IMAGE AND, BASED ON THE APPLICATION OF THE MULTI-SPATIAL IMAGE RECONSTRUCTION PROCESS, GENERATE IMAGE VOLUME DATA

612
PROVIDE THE IMAGE VOLUME DATA FOR DISPLAY

FIG. 6

METHODS AND APPARATUS FOR MULTI-SPATIAL GUIDED IMAGE RECONSTRUCTION

FIELD

Aspects of the present disclosure relate in general to medical diagnostic systems and, more particularly, to reconstructing images from nuclear imaging systems for diagnostic and reporting purposes.

BACKGROUND

Nuclear imaging systems can employ various technologies to capture images. For example, some nuclear imaging systems employ positron emission tomography (PET) to capture images. PET is a nuclear medicine imaging technique that produces tomographic images representing the distribution of positron emitting isotopes within a body. Some nuclear imaging systems employ Magnetic Resonance Imaging (MRI), for example, as a co-modality. Resonance Imaging (MRI) is an imaging technique that uses magnetic fields and radio waves to generate anatomical and functional images. CT is an imaging technique that uses x-rays to produce anatomical images. Some nuclear imaging systems combine images from PET and MRI scanners to produce images that show information from both a PET scan and an MRI scan. Similarly, some nuclear imaging systems combine images from PET and CT scanners during an image fusion process to produce images that show information from both a PET scan and a CT scan (e.g., PET/CT systems).

Typically, these nuclear imaging systems capture measurement data, and process the captured measurement data using mathematical algorithms to reconstruct medical images. For example, reconstruction can be based on the models that can include analytic or iterative algorithms or, more recently, deep learning algorithms. These conventional models, however, can have several drawbacks. For instance, the models may result in poor quality medical images, such as medical images that poorly show, or even fail to show, scanned features of a subject. Moreover, many image formation processes employed by at least some of these systems rely on approximations to compensate for detection loss. The approximations, however, can cause inaccurate and/or lower quality medical images. As such, there are opportunities to address these and other deficiencies in nuclear imaging systems.

SUMMARY

Systems and methods for reconstructing medical images based on co-modality sequences with multiple spatial resolutions are disclosed.

In some embodiments, a computer-implemented method includes receiving positron emission tomography (PET) measurement data and anatomy measurement data from an image scanning system. The method further includes generating a PET image based on the PET measurement data. In addition, the method includes generating a plurality of anatomy images based on the anatomy measurement data, the plurality of anatomy images comprising a plurality of spatial resolutions. The method also includes applying an image reconstruction process to the PET measurement data and the plurality of anatomy image and, based on the application of the image reconstruction process, generating image volume data. Further, the method includes storing the image volume data in a data repository.

In some embodiments, a non-transitory computer readable medium stores instructions that, when executed by at least one processor, cause the at least one processor to perform operations including receiving positron emission tomography (PET) measurement data and anatomy measurement data from an image scanning system. The operations further include generating a PET image based on the PET measurement data. In addition, the operations include generating a plurality of anatomy images based on the anatomy measurement data, the plurality of anatomy images comprising a plurality of spatial resolutions. The operations also include applying an image reconstruction process to the PET measurement data and the plurality of anatomy image and, based on the application of the image reconstruction process, generating image volume data. Further, the operations include storing the image volume data in a data repository.

In some embodiments, a system comprises a data repository and at least one processor communicatively coupled to the data repository. The at least one processor is configured to receive positron emission tomography (PET) measurement data and anatomy measurement data from an image scanning system. The at least one processor is further configured to generate a PET image based on the PET measurement data. In addition, the at least one processor is configured to generate a plurality of anatomy images based on the anatomy measurement data, the plurality of anatomy images comprising a plurality of spatial resolutions. The at least one processor is also configured to apply an image reconstruction process to the PET measurement data and the plurality of anatomy image and, based on the application of the image reconstruction process, generate image volume data. Further, the at least one processor is configured to store the image volume data in a data repository.

BRIEF DESCRIPTION OF THE DRAWINGS

The following will be apparent from elements of the figures, which are provided for illustrative purposes and are not necessarily drawn to scale.

FIG. 2 illustrates a block diagram of an example computing device that can perform one or more of the functions described herein, in accordance with some embodiments.

FIG. 5 is a flowchart of an example method to reconstruct a medical image, in accordance with some embodiments.

FIG. 6 is a flowchart of another example method to reconstruct a medical image, in accordance with some embodiments.

DETAILED DESCRIPTION

Figure 1:
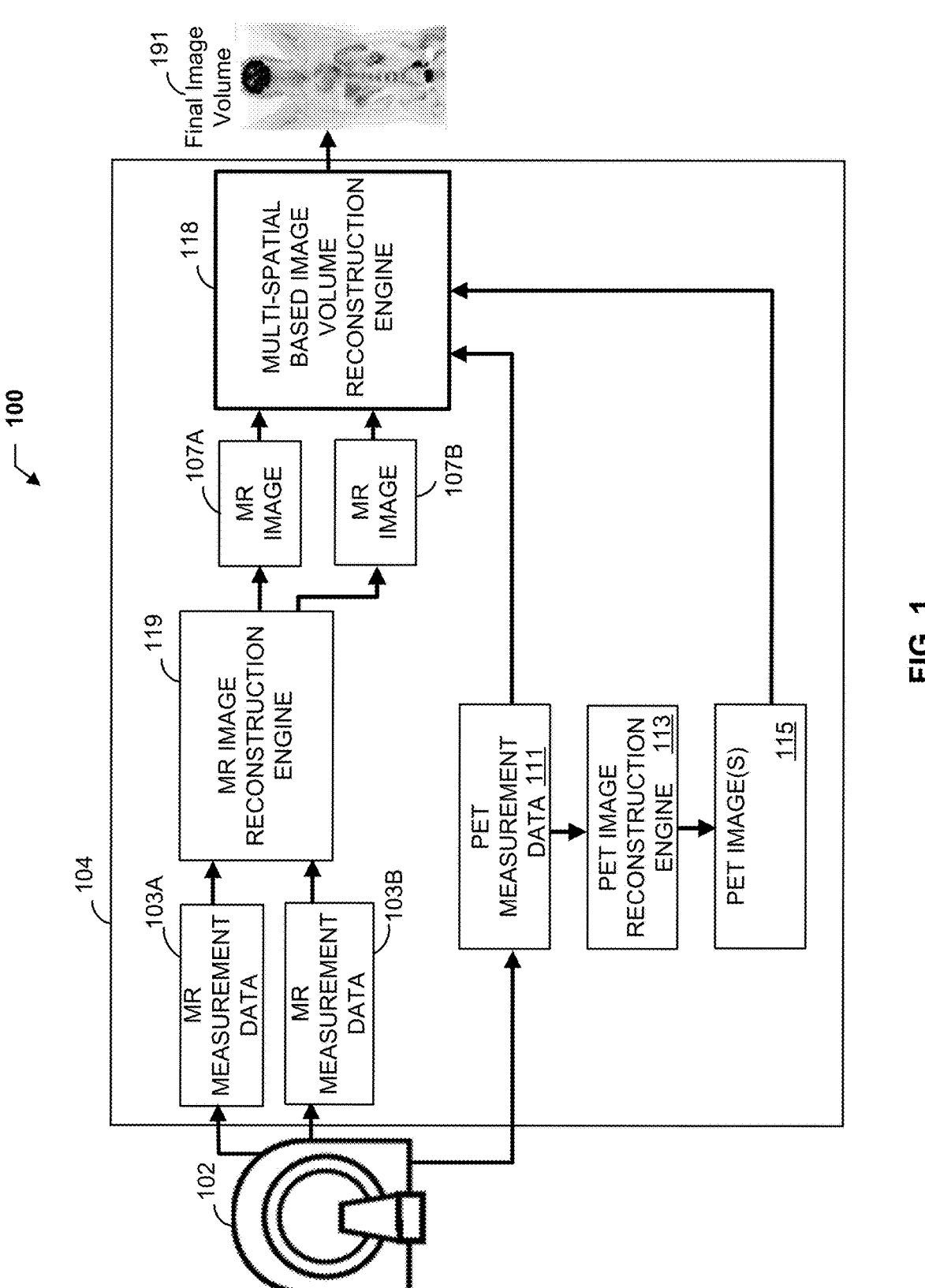
FIG. 1 illustrates a nuclear image reconstruction system, in accordance with some embodiments.

This description of the exemplary embodiments is intended to be read in connection with the accompanying drawings, which are to be considered part of the entire written description.

The exemplary embodiments are described with respect to the claimed systems as well as with respect to the claimed methods. Furthermore, the exemplary embodiments are described with respect to methods and systems for image reconstruction, as well as with respect to methods and systems for training functions used for image reconstruction. Features, advantages, or alternative embodiments herein can be assigned to the other claimed objects and vice versa. For example, claims for the providing systems can be improved with features described or claimed in the context of the methods, and vice versa. In addition, the functional features of described or claimed methods are embodied by objective units of a providing system. Similarly, claims for methods and systems for training image reconstruction functions can be improved with features described or claimed in context of the methods and systems for image reconstruction, and vice versa.

Various embodiments of the present disclosure can employ machine learning methods or processes to provide clinical information from nuclear imaging systems. For example, the embodiments can employ machine learning methods or processes to reconstruct images based on captured measurement data, and provide the reconstructed images for clinical diagnosis. In some embodiments, machine learning methods or processes are trained, to improve the reconstruction of images.

Anatomically guided Positron Emission Tomography (PET) image reconstruction, such as Magnetic Resonance Imaging (MRI) guided PET image reconstruction, can suffer from the poor anisotropic spatial resolution of MRI images of parts of the body due to, for example, time constraints. Usually, multiple MRI sequences (e.g., scans) are acquired with suitable spatial resolution in two dimensions (e.g., the axial, coronal, and sagittal dimensions), but with poor resolution in a $3^{rd}$ dimension, such as when scanning whole body. As a result, using these multiple sequences during the anatomically-guided PET reconstruction process can result in inaccurate and/or lower quality reconstructed PET images.

The embodiments described herein apply multiple co-modality images with multiple spatial resolutions, such as MRI sequences with multiple spatial resolutions, to reconstruct PET images. The processes described herein may mitigate the typically poor resolution in the $3^{rd}$ dimension, thereby resulting in higher quality reconstructed medical images.

In some embodiments, an image reconstruction system receives PET measurement data from an image scanning system. The PET measurement data may characterize a PET scan of a subject (e.g., patient). The image reconstruction system also receives anatomy measurement data, such as MRI measurement data, from the image scanning system. As an example, the image scanning system may capture MRI scans of the subject, and may transmit MRI measurement data characterizing the MRI scans to the image reconstruction system. The MRI scans may include differing spatial resolutions. For example, voxels of the first MRI scans may include a voxel size with a dimension size that is larger (e.g., significantly larger) in a first dimension than in the second and third dimensions (i.e., for a three dimensional voxel). In addition, voxels of the second MRI scans may include a voxel size with a dimension size that is larger in the second dimension than in the first and third dimensions. For instance, each of the first MRI scans may include a voxel size of 1.1 mm×1.1 mm×7.0 mm, and each of the second MRI scans may include a voxel size of 1.1 mm×7.0 mm×1.1 mm (corresponding to "X," "Y," and "Z" dimensions). In this example, the first MRI scans provide higher (e.g., better) resolution in the "X" and "Y" dimensions (given the 1.1 mm sizes) than in the "Z" dimension (given the 7.0 mm size). Further, each of the second MRI scans provide higher resolution in the "X" and "Z" dimensions (given the 1.1 mm sizes) than in the "Y" dimension (given the 7.0 mm size).

Further, the image reconstruction system may apply a PET image reconstruction process to the PET measurement data to generate a corresponding PET image. For instance, the PET image reconstruction process may include computing an iterative statistical algorithm, such as ordered subset expectation maximization (OSEM) algorithm, based on the PET measurement data to generate the PET image. The image reconstruction system may also apply an MRI image reconstruction process to each of the first MRI scan data and the second MRI scan data to generate a first MRI image and a second MRI image, respectively. For instance, the image reconstruction system may sample the first MRI scan data to generate the first MRI image, and may sample the second MRI scan data to generate the second MRI image.

Additionally, the image reconstruction system may apply a multi-spatial image reconstruction process to the PET measurement data and the first and second MRI images to generate final image volume data characterizing a final reconstructed PET image. The multi-spatial image reconstruction process may include, for example, registering each of the first MRI image and the second MRI image to the PET image. For instance, the first MRI and second MRI images may be registered to the PET image based on an ordered subset expectation maximization (OSEM) algorithm. Once registered, the first MRI image may be aligned to the PET image. Similarly, once registered, the second MRI image may be aligned to the PET image as well. In some instances, the multi-spatial image reconstruction process may include resampling volumes of each of the registered first MRI image and the registered second MRI image to a corresponding volume of the PET image. Further, the multi-spatial image reconstruction process may include executing a multi-spatial reconstruction model (e.g., algorithm) that operates on the PET measurement data, the registered first MRI image, and the registered second MRI image to generate the reconstructed PET image. The multi-spatial reconstruction model may be an objective function (i.e., objective model) that includes a prior information function (i.e., prior information model) with a similarity function (i.e., similarity model) that applies weights based on values of the registered first MRI image and the registered second MRI image. For instance, the weights may be computed based on the following equation:

$$\varpi_{jb} = \qquad\qquad\qquad\qquad\qquad\qquad\text{(eq. 1)}$$
$$\frac{1}{p(u_j, u_b)} \exp\left(-\frac{(u_j - u_b)^2}{2\sigma_u^2}\right) \exp\left(-\frac{(v_{1j} - v_{1b})^2}{2\sigma_v^2}\right) \exp\left(-\frac{(v_{2j} - v_{2b})^2}{2\sigma_v^2}\right)$$

where j is the voxel index, b is the index for the voxels in the neighborhood around voxel j, $v_1$ is the registered first MRI image, $v_2$ is the registered second MRI image, $\sigma$ is the standard deviation in u and v, and $p(u_j, v_j)$ is defined as a non-parametric Parzen window using Gaussian kernels.

In some examples, the multi-spatial reconstruction model may be a machine learning model, such as a neural network (e.g., convolutional neural network) that is configured to receive features generated based on the first MRI image, the second MRI image, and the PET image, and to output values characterizing the final reconstructed PET image.

The final reconstructed PET image may be stored in a data repository, and/or displayed to a medical professional, such as a radiologist, for example. Although two co-modality images are described above (e.g., first MRI image and second MRI image), in other examples, the multi-spatial image reconstruction process may include registering additional co-modality images with varying spatial resolutions, and generating the final reconstructed PET image based on the additional co-modality images as well. For instance, the image reconstruction system may receive from the image scanning system MRI measurement data characterizing MRI scans with three, four, five, or any number of differing spatial resolutions.

Among other advantages, the embodiments described herein may achieve superior 3D spatial resolution within the reconstructed PET image compared to conventional methods. As such, the embodiments may provide medical professionals with higher quality images, which may aid with diagnostic and reporting activities. Persons of ordinary skill in the art may recognize these and other advantages as well.

FIG. 1 illustrates one embodiment of a nuclear imaging system 100. As illustrated, nuclear imaging system 100 includes image scanning system 102 and image reconstruction system 104. Image scanning system 102, in this example, can be a PET/MR scanner that can capture PET and MRI images (i.e., MR images), a combination of a PET/CT scanner that can capture PET and CT images and an MR scanner that can capture MRI images, a combination of a PET scanner and an MR scanner, or any other suitable image scanner or combination of image scanners that can capture PET and MRI images. For instance, image scanning system 102 can be a PET/MR scanner that can capture MRI images (e.g., of a person), and generate MR measurement data 103A, 103B based on the MR scans. For instance, MR measurement data 103A may correspond to an MRI image captured using a first acquisition protocol, and MR measurement data 103B may correspond to an MRI image captured using a second acquisition protocol, where the first and second acquisition protocols differ. Image scanning system 102 can also capture PET images (e.g., of the person), and generate PET measurement data 111 (e.g., PET raw data, such as sinogram data) based on the captured PET images. The PET measurement data 111 can represent anything imaged in the scanner's field-of-view (FOV) containing positron emitting isotopes. For example, the PET measurement data 111 can represent whole-body image scans, such as image scans from a patient's head to thigh, or more directed scans, such as image scans of one or more organs of the patient. Image scanning system 102 can transmit the MR measurement data 103A, 103B and the PET measurement data 111 to image reconstruction system 104.

In some examples, all or parts of image reconstruction system 104 are implemented in hardware, such as in one or more field-programmable gate arrays (FPGAs), one or more application-specific integrated circuits (ASICs), one or more state machines, one or more computing devices, digital circuitry, or any other suitable circuitry. In some examples, parts or all of image reconstruction system 104 can be implemented in software as executable instructions such that, when executed by one or more processors, cause the one or more processors to perform respective functions as described herein. The instructions can be stored in a non-transitory, computer-readable storage medium, for example.

For example, FIG. 2 illustrates a computing device 200 that can be employed by the image reconstruction system 104. Computing device 200 can implement, for example, one or more of the functions of image reconstruction system 104 described herein.

Computing device 200 can include one or more processors 201, working memory 202, one or more input/output devices 203, instruction memory 207, a transceiver 204, one or more communication ports 209, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. Further, instruction memory 207 can store instructions that, when executed by one or more processors 201, cause one or more processors 201 to perform one or more of the functions of image reconstruction system 104 described herein.

In addition, processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of computing device 200. Working memory 202 can be a random access memory (RAM) such as a static random access memory (SRAM) or dynamic random access memory (DRAM), or any other suitable memory.

Input/output devices 203 can include any suitable device that allows for data input or output. For example, input/output devices 203 can include one or more of a keyboard, a touchpad, a mouse, a stylus, a touchscreen, a physical button, a speaker, a microphone, or any other suitable input or output device.

Communication port(s) 207 can include, for example, a serial port such as a universal asynchronous receiver/transmitter (UART) connection, a Universal Serial Bus (USB) connection, or any other suitable communication port or connection. In some examples, communication port(s) 207 allows for the programming of executable instructions in instruction memory 207. In some examples, communication port(s) 207 allow for the transfer (e.g., uploading or downloading) of data, such as MR measurement data 103A, 103B and attenuation maps 105.

Display 206 can display user interface 205. User interfaces 205 can enable user interaction with computing device 200. For example, user interface 205 can be a user interface for an application that allows for the viewing of final image volumes 191. In some examples, a user can interact with user interface 205 by engaging input/output devices 203. In some examples, display 206 can be a touchscreen, where user interface 205 is displayed on the touchscreen.

Transceiver 204 allows for communication with a network, such as a Wi-Fi network, an Ethernet network, a cellular network, or any other suitable communication network. For example, if operating in a cellular network, transceiver 204 is configured to allow communications with the cellular network. Processor(s) 201 is operable to receive data from, or send data to, a network via transceiver 204.

Referring back to FIG. 1, image reconstruction system 104 includes MR image reconstruction engine 119, PET image reconstruction engine 113, and multi-spatial based image volume reconstruction engine 118. MR image reconstruction engine 119 operates on MR measurement data 103A (e.g., MR raw data) and MR measurement data 103B to generate reconstructed MR images 107A, 107B, respectively. MR image reconstruction engine 119 can generate MR images 107A, 107B based on corresponding MR measurement data 103A, 103B using any suitable method (e.g., algorithm) known in the art. Further, MR image 107A and MR image 107B have varying spatial resolutions. For instance, MR image 107A may include a higher resolution (e.g., based on how a corresponding scan was imaged) in at least a first dimension (e.g., axial dimension) than in a second dimension (e.g., coronal dimension), while MR image 107B may include a higher resolution in at least the second dimension than in the first dimension. As an example, MR image 107A may include volumes of voxel size 1.1×1.1×7.0 mm, where MR image 107B may include volumes with voxel size of 1.3×7.0×1.3 mm.

Further, PET image reconstruction engine 113 operates on PET measurement data 111 to generate reconstructed PET image 115. PET image reconstruction engine 113 can generate reconstructed PET images 115 based on corresponding PET measurement data 111 using any suitable method known in the art, such as MLEM (Shepp and Vardi, IEEE TMI, 1982).

In addition, multi-spatial based image volume reconstruction engine 118 receives MR image 107A, MR image 107B, PET image 115, and PET measurement data 111. Multi-spatial based image volume reconstruction engine 118 applies a registration process to the MR image 107A and the PET image 115 to register the MR image 107A to the PET image 115. Similarly, multi-spatial based image volume reconstruction engine 118 applies the registration process to the MR image 107B and the PET image 115 to register the MR image 107B to the PET image 115. Multi-spatial based image volume reconstruction engine 118 then applies a multi-spatial image reconstruction process to the registered MR image 107A, registered MR image 107B, and the PET measurement data 111 to generate a final reconstructed PET image, such as final image volume 191. As such, the PET measurement data 111 (e.g., the raw PET data) undergoes a multi-spatial anatomically-guided PET reconstruction to generate the final image volume 191. In some instances, the multi-spatial image reconstruction process may include resampling volumes of each of the registered MR image 107A and the registered MR image 107B to a corresponding volume of the PET image 115.

Further, the multi-spatial image reconstruction process may include computing output values characterizing the final image volume 191 (e.g., the reconstructed PET image) based on input values of the PET image 115, the registered MR image 107A, and the registered MR image 107B. For instance, the multi-spatial image reconstruction process may include computing weighting values based on the input values of the registered MR image 107A and the registered MR image 107B, and applying the weighting values to a similarity function of a prior information function of an objective function that generates the output values characterizing the final image volume 191.

The final image volume 191, among other advantages, may achieve superior 3D spatial resolution within the final image volume 191 (i.e., the reconstructed PET image) compared to conventional methods. As such, the final image volume 191 may provide medical professionals with higher quality images, which may aid with diagnostic and reporting activities.

Figure 7B:
FIGS. 7A, 7B, and 7C illustrate exemplary images generated by a nuclear image reconstruction system, in accordance with some embodiments.
Figure 7A:
Figure 7C:
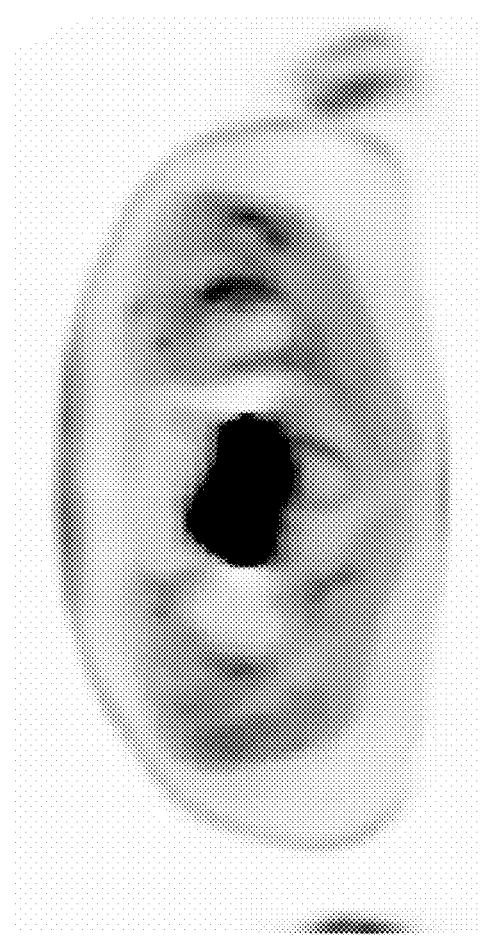

For instance, FIG. 7A illustrates an axial view of an MRI image of a subject in a particular position, and generated with voxel sizes of 1.1×1.1×7.0 mm. As such, the MRI image of FIG. 7A has lower coronal dimension resolution compared to the axial and sagittal dimensions. FIG. 7B illustrates an axial view of an MRI image generated with voxel sizes of 1.3×7.0×1.3 mm of the same subject in the same position. As such, the MRI image of FIG. 7B has lower axial dimension resolution compared to the coronal and sagittal dimensions. FIG. 7C illustrates a reconstructed PET image generated based on the MRI images of FIGS. 7A and 7B, and using one of the exemplary processes described herein. The reconstructed PET image of FIG. 7C may provide a higher 3D spatial resolution than, for example, PET images reconstructed using conventional methods.

Figure 8B:
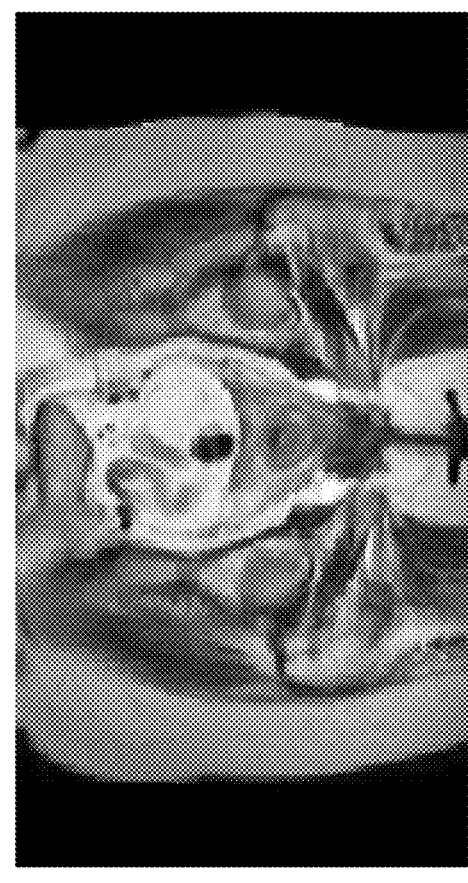
FIGS. 8A, 8B, and 8C illustrate exemplary images generated by a nuclear image reconstruction system, in accordance with some embodiments.
Figure 8C:
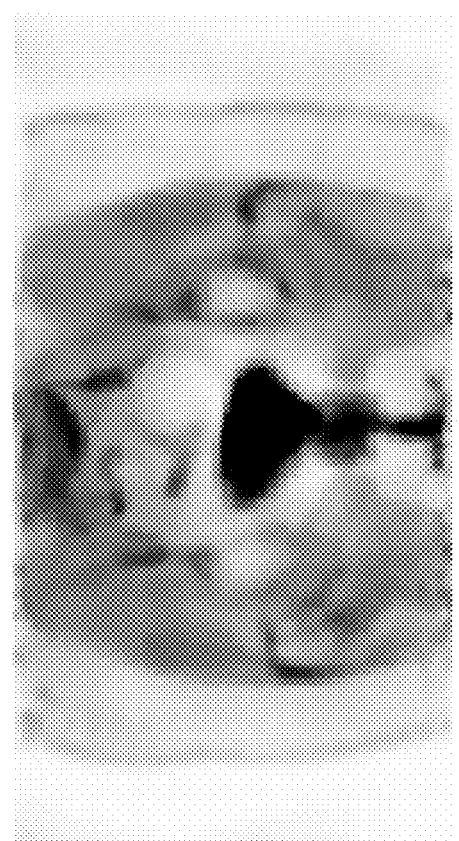
Figure 8A:

Similarly, FIG. 7B illustrates a coronal view of an MRI image generated with voxel sizes of 1.1×1.1×7.0 mm of the same subject in the same position. As such, the MRI image of FIG. 8A has lower coronal dimension resolution compared to the axial and sagittal dimensions. FIG. 8B illustrates a coronal view of an MRI image generated with voxel sizes of 1.3×7.0×1.3 mm. As such, the MRI image of FIG. 8B has lower axial dimension resolution compared to the coronal and sagittal dimensions. FIG. 8C illustrates a reconstructed PET image generated based on the MRI images of FIGS. 8A and 8B, and using one of the exemplary processes described herein. The reconstructed PET image of FIG. 8C may provide a higher 3D spatial resolution than, for example, PET images reconstructed using conventional methods.

Figure 3:
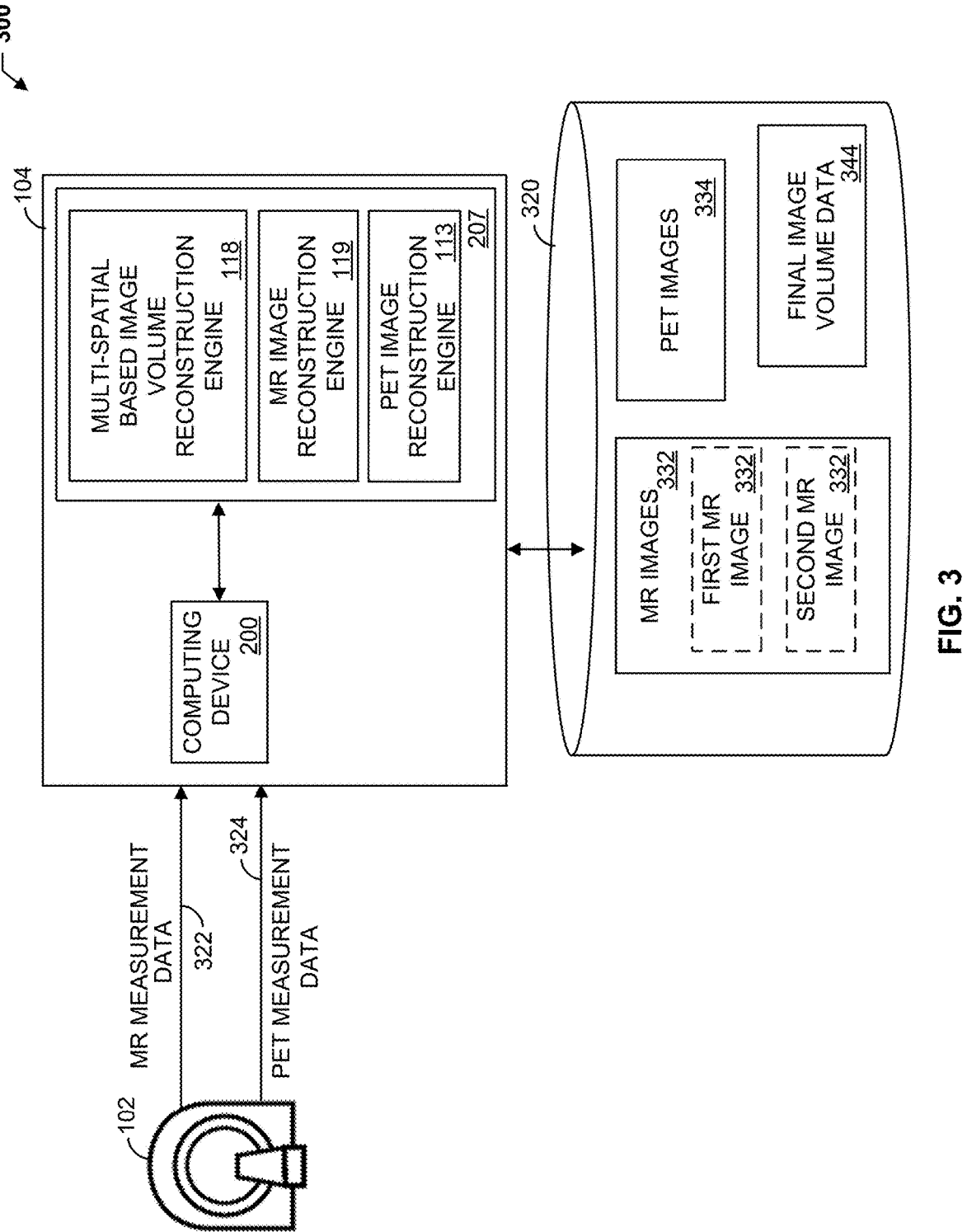
FIG. 3 illustrates a nuclear image reconstruction system, in accordance with some embodiments.

Referring now to FIG. 3, a nuclear imaging system 300 includes image scanning system 102 and image reconstruction system 104. As illustrated, image reconstruction system 104 includes multi-spatial based image volume reconstruction engine 118, MR image reconstruction engine 119, and PET image reconstruction engine 113 as executable instructions stored within instruction memory 207. Further, computing device 200 is communicatively coupled to instruction memory 207 over one or more wired or wireless communication buses 305, and is configured to obtain and execute one or more of these executable instructions.

As described herein, image scanning system 102 may be a PET/MR scanner that can capture PET scans as well as MRI scans of a subject. For instance, image scanning system 102 may capture one or more PET scans of the subject, and generate PET measurement data 324 characterizing the captured PET scans. Similarly, image scanning system 102 may capture one or more MRI scans of the subject, and generate MR measurement data 322 characterizing the captured MRI scans. Image scanning system 102 may transmit the PET measurement data 324 and MR measurement data 322 to image reconstruction system 104.

As described herein, computing device 200 may execute PET image reconstruction engine 113 to apply a PET reconstruction process to the PET measurement data 324 and, based on the application of the PET reconstruction process, generate one or more PET images 334. Further, computing device 200 may execute the PET image reconstruction engine 113 to store the PET images 334 in a data repository, such as data repository 320. In addition, computing device 200 may execute MR image reconstruction engine 119 to apply an MR reconstruction process to the MR measurement data 322 and, based on the application of the MR reconstruction process, generate one or more MR images 332. For instance, the MR measurement data 322 may characterize a first MR image captured with a first acquisition protocol, and a second MR image captured with a second acquisition protocol. Further, computing device 200 may execute the MR image reconstruction engine 119 to register the MR images 332 to the PET measurement data 324, and may store the MR images 332 in data repository 320. The registered MR images 332 may include multiple MR images with varying spatial resolutions. For instance, the registered MR images 332 may include a first registered MR image 332A that has a higher resolution in a first and second dimensions compared to a third dimension. The registered MR images 332 may also include a second registered MR image 332B that has a higher resolution in the second and third dimension that in the first dimension.

Additionally, image reconstruction system 104 may apply a multi-spatial image reconstruction process to the registered MR images 332, including first MR image 332A and second MR image 332B, and to a corresponding PET measurement data 324 to generate final image volume data 344 characterizing a reconstructed PET image, such as the final image volume 191 of FIG. 1.

As described herein, the multi-spatial image reconstruction process may include performing operations to register each of the first MR image 332A and second MR image 332B to the PET image 334, inputting values of the PET measurement data 324, the registered first MR image 332A, and the registered second MR image 332B to an objective function, and processing the inputted values to generate output values characterizing the final image volume data 344 (e.g., a reconstructed PET image). As described herein, the first MR image 332A and the second MR image 332B are used as prior information that guides the reconstruction of the reconstructed PET image characterized by the final image volume data 344.

In some examples, the multi-spatial reconstruction model may be a machine learning model, such as a neural network (e.g., deep learning neural network, convolutional neural network) that is configured to receive features generated based on the first MR image 332A, the second MRI image 332B, and the PET image 334, and to output values of the final image volume data 344. The machine learning model may be trained on MR images 332 and corresponding PET images 334, for instance, where the MR images 332 include MR images of varying spatial resolutions. For example, the machine learning model can be trained based on previously generated MR images 332 and corresponding PET images 334 (e.g., ground truth data) during a training period, and can be validated during a validation period, such as by comparing generated final image volume data 344 to expected final image volume data. For instance, computing device 200 may execute a loss function to determine a loss between the generated final image volume data 344 and the expected final image volume data, and may determine that training is complete when the computed loss is beyond (e.g., below) a corresponding threshold.

Figure 4:
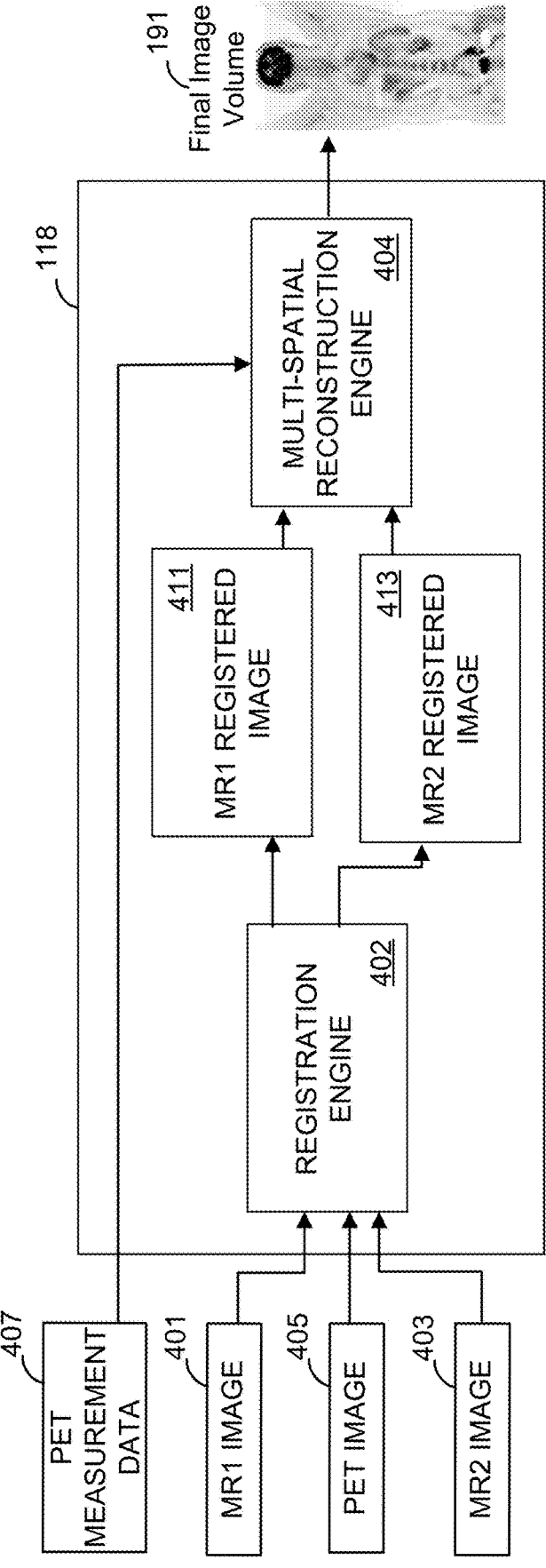
FIG. 4 illustrates further details of exemplary portions of the nuclear image reconstruction system of FIG. 1, in accordance with some embodiments.

FIG. 4 illustrates portions of the multi-spatial based image volume reconstruction engine 118 of FIG. 1. As illustrated, multi-spatial based image volume reconstruction engine 118 includes registration engine 402 and multi-spatial reconstruction engine 404. Registration engine 402 is configured to perform operations to register MR images of varying spatial resolutions to a PET image, thereby aligning the MR images to the PET image. For example, registration engine 402 may receive MR1 image 401 and MR2 image 403, and PET image 405 (e.g., from memory or after being reconstructed from PET measurement data 407 received from an image scanning system, such as image scanning system 102). MR1 image 401 and MR2 image 403 may include varying spatial resolutions. For instance, MR1 image 401 may include voxels with higher resolution in the axial and sagittal dimensions that in the coronal dimension, while MR2 image 403 may include voxels with higher resolution in the coronal and sagittal dimensions than in the coronal dimension. Registration engine 402 may execute any suitable registration function (e.g., algorithm), such as an ordered subset expectation maximization (OSEM) algorithm, to generate MR1 registered image 411, which characterizes the MR1 image 401 aligned to the PET image 405. Similarly, registration engine 402 may execute the suitable registration function to generate MR2 registered image 413, which characterizes the MR2 image 403 aligned to the PET image 405.

Further, multi-spatial reconstruction engine 404 receives the MR1 registered image 411, the MR2 registered image 413, and the PET measurement data 407, and based on the MR1 registered image 411, the MR2 registered image 413, and the PET measurement data 407, generates final image volume 191 characterizing a reconstructed PET image. For instance, multi-spatial reconstruction engine 404 may execute any of the multi-spatial reconstruction models described herein, such as any of the objective functions or machine learning models described herein, that receive the MR1 registered image 411, the MR2 registered image 413, and the PET measurement 407 and, based on the MR1 registered image 411, the MR2 registered image 413, and the PET measurement data 407, generate the final image volume 191.

FIG. 5 is a flowchart of an example method 500 to reconstruct a PET image. The method can be performed by the image reconstruction system 104 described herein. Beginning at block 502, PET measurement data is received from an image scanning system. In addition, anatomy measurement data with differing spatial resolutions is also received from the image scanning system. For example, as described herein, image reconstruction system 104 may receive PET measurement data 111 and MR measurement data 103A and MR measurement data 103B from image scanning system 102. The MR measurement data 103A and MR measurement data 103B may characterize corresponding MRI scans of a subject with varying spatial resolutions.

Further, at block 504, a PET image is generated based on the PET measurement data. For instance, as described herein, image reconstruction system 104 may reconstruct a PET image 115 based on the PET measurement data 111. At block 506, a plurality of anatomy images are generated based on the anatomy measurement data. Each of the anatomy images may include differing spatial resolutions. For example, image reconstruction system 104 may generate MR image 107A and MR image 107B based on corresponding MR measurement data 103A, 103B, where MR image 107A includes a spatial resolution that is higher in at least a first dimension (e.g., axial dimension) than in a second dimension (e.g., coronal dimension), while MR image 107B may include a higher resolution in at least the second dimension than in the first dimension.

Proceeding to block 508, a multi-spatial image reconstruction process is applied to the PET measurement data and the plurality of anatomy images. Based on the application of the multi-spatial image reconstruction process, image volume data is generated. The image volume data may characterize a reconstructed PET image. For example, and as described herein, image reconstruction system 104 may execute any of the multi-spatial reconstruction models described herein that receive the PET measurement data and the plurality of anatomy images, and generate the image volume data that characterizes the final image volume 191. As described herein, in some examples, the multi-spatial reconstruction model may be an objective function that includes a prior information function with a similarity function that applies weights based on values of the plurality of anatomy images. The weights may be computed based on equation 1 above, for instance.

Further, and at block 510, the image volume data is stored in a data repository. For instance, the image reconstruction system 104 may store the image volume data as final image volume data 344 in data repository 320.

FIG. 6 is a flowchart of an example method 600 to reconstruct a PET image. The method can be performed by the image reconstruction system 104 described herein. Beginning at block 602, a PET image is received. For example, image reconstruction system 104 may receive PET image 405. At block 604, a first MRI image with a first spatial resolution is received. In addition, a second MRI image with a second spatial resolution is received. For instance, image reconstruction system 104 may receive MR1 image 401 and MR2 image 403.

Proceeding to block 606, a registration process is applied to the first MRI image and the PET image. The registration process may be based on an ordered subset expectation maximization (OSEM) algorithm, for example. Based on the registration process, a first registered MRI image is generated. Similarly, at block 608, a registration process is applied to the second MRI image and the PET image. Based on the registration process, a second registered MRI image is generated. For example, and as described herein, image reconstruction system 104 may apply a reconstruction process to MR1 image 401 and PET image 405 to generate MR1 registered image 411 that is registered to the PET image 405. Similar, image reconstruction system 104 may apply a reconstruction process to MR2 image 403 and PET image 405 to generate MR2 registered image 413 that is registered to the PET image 405.

Further, and at block 610, a multi-spatial reconstruction process is applied to the PET measurement data, the registered first MRI image, and the registered second MRI image. Based on the application of the multi-spatial image reconstruction process, image volume data is generated. The image volume data may characterize a reconstructed PET image. For example, and as described herein, image reconstruction system 104 may execute any of the multi-spatial reconstruction models described herein to receive MR1 registered image 411, MR2 registered image 413, and the PET measurement data 407, and generate final image volume 191 characterizing a reconstructed PET image. As described herein, in some examples, the multi-spatial reconstruction model may be an objective function that includes a prior information function with a similarity function that applies weights based on values of the plurality of anatomy images. The weights may be computed based on equation 1 above, for instance.

Further, and at block 612, the image volume data is provided for display. For example, computing device 200 may provide the image volume data to a display 206 for a medical professional to view.

The following is a list of non-limiting illustrative embodiments disclosed herein:

Illustrative Embodiment 1: A computer-implemented method comprising:

receiving positron emission tomography (PET) measurement data and anatomy measurement data from an image scanning system;

generating a PET image based on the PET measurement data;

generating a plurality of anatomy images based on the anatomy measurement data, the plurality of anatomy images comprising a plurality of spatial resolutions;

applying an image reconstruction process to the PET measurement data and the plurality of anatomy images and, based on the application of the image reconstruction process, generating image volume data; and storing the image volume data in a data repository.

Illustrative Embodiment 2: The computer-implemented method of illustrative embodiment 1, wherein the plurality of anatomy images comprise a first anatomy image and a second anatomy image, wherein the first anatomy image comprises voxels with a higher resolution in a first dimension that in at least a second dimension, and the second anatomy image comprises voxels with a higher resolution in the second dimension that in at least the first dimension.

Illustrative Embodiment 3: The computer-implemented method of illustrative embodiment 2 wherein the first dimension is an axial dimension and the second dimension is a coronal dimension.

Illustrative Embodiment 4: The computer-implemented method of any of illustrative embodiments 1-3, wherein applying the image reconstruction process to the PET measurement data and the plurality of anatomy images comprises registering the plurality of anatomy images to the PET image.

Illustrative Embodiment 5: The computer-implemented method of any of illustrative embodiments 1-4, wherein applying the image reconstruction process to the PET measurement data and the plurality of anatomy images comprises:

determining weighting values based on the plurality of anatomy images and the PET image; and generating the image volume data based on the weighting values.

Illustrative Embodiment 6: The computer-implemented method of illustrative embodiment 5, further comprising applying the weighting values to an output of a similarity function.

Illustrative Embodiment 7: The computer-implemented method of any of illustrative embodiments 1-6, wherein the plurality of anatomy images comprise a first Magnetic Resonance Imaging (MRI) image and a second MRI image.

Illustrative Embodiment 8: The computer-implemented method of illustrative embodiment 7, wherein the first MRI image includes voxels with a resolution in a first dimension that differs from a resolution in the first dimension of voxels of the second MRI image.

Illustrative Embodiment 9: The computer-implemented method of any of illustrative embodiments 1-8, further comprising sampling volumes of each of the plurality of anatomy images to a corresponding volume of the PET image.

Illustrative Embodiment 10: The computer-implemented method of any of illustrative embodiments 1-9, further comprising providing the image volume data for display.

Illustrative Embodiment 11: A non-transitory computer readable medium storing instructions that, when executed by at least one processor, cause the at least one processor to perform operations comprising:

receiving positron emission tomography (PET) measurement data and anatomy measurement data from an image scanning system;

generating a PET image based on the PET measurement data;

generating a plurality of anatomy images based on the anatomy measurement data, the plurality of anatomy images comprising a plurality of spatial resolutions;

applying an image reconstruction process to the PET measurement data and the plurality of anatomy images and, based on the application of the image reconstruction process, generating image volume data; and storing the image volume data in a data repository.

Illustrative Embodiment 12: The non-transitory computer readable medium of illustrative embodiment 11, wherein the plurality of anatomy images comprise a first anatomy image and a second anatomy image, wherein the first anatomy image comprises voxels with a higher resolution in a first dimension that in at least a second dimension, and the second anatomy image comprises voxels with a higher resolution in the second dimension that in at least the first dimension.

Illustrative Embodiment 13: The non-transitory, computer readable medium of any of illustrative embodiments 11-12 storing instructions that, when executed by the at least one processor, further cause the at least one processor to perform operations comprising:

determining weighting values based on the plurality of anatomy images and the PET image; and generating the image volume data based on the weighting values.

Illustrative Embodiment 14: The non-transitory, computer readable medium of illustrative embodiment 13 storing instructions that, when executed by the at least one processor, further cause the at least one processor to perform operations comprising applying the weighting values to an output of a similarity function.

Illustrative Embodiment 15: The non-transitory, computer readable medium of any of illustrative embodiments 11-14, wherein the plurality of anatomy images comprise a first Magnetic Resonance Imaging (MRI) image and a second MRI image, and wherein the first MRI image includes voxels with a resolution in a first dimension that differs from a resolution in the first dimension of voxels of the second MRI image.

Illustrative Embodiment 16: A system comprising:

a data repository; and at least one processor communicatively coupled to the data repository and configured to:

receive positron emission tomography (PET) measurement data and anatomy measurement data from an image scanning system;

generate a PET image based on the PET measurement data;

generating a plurality of anatomy images based on the anatomy measurement data, the plurality of anatomy images comprising a plurality of spatial resolutions;

apply an image reconstruction process to the PET measurement data and the plurality of anatomy images and, based on the application of the image reconstruction process, generate image volume data; and store the image volume data in the data repository.

Illustrative Embodiment 17: The system of illustrative embodiment 16, wherein the plurality of anatomy images comprise a first anatomy image and a second anatomy image, wherein the first anatomy image comprises voxels with a higher resolution in a first dimension that in at least a second dimension, and the second anatomy image comprises voxels with a higher resolution in the second dimension that in at least the first dimension.

Illustrative Embodiment 18: The system of any of illustrative embodiments 16-17, wherein the at least one processor is configured to:

determine weighting values based on the plurality of anatomy images and the PET image; and generate the image volume data based on the weighting values.

Illustrative Embodiment 19: The system of illustrative embodiment 18, wherein the at least one processor is configured to apply the weighting values to an output of a similarity function.

Illustrative Embodiment 20: The system of any of illustrative embodiments 16-19, wherein the plurality of anatomy images comprise a first Magnetic Resonance Imaging (MRI) image and a second MRI image, and wherein the first MRI image includes voxels with a resolution in a first dimension that differs from a resolution in the first dimension of voxels of the second MRI image.

Illustrative Embodiment 21: A system comprising:

a means for receiving positron emission tomography (PET) measurement data and anatomy measurement data from an image scanning system;

a means for generating a PET image based on the PET measurement data;

a means for generating a plurality of anatomy images based on the anatomy measurement data, the plurality of anatomy images comprising a plurality of spatial resolutions;

a means for applying an image reconstruction process to the PET measurement data and the plurality of anatomy images and, based on the application of the image reconstruction process, generating image volume data; and a means for storing the image volume data in a data repository.

Illustrative Embodiment 22: The system of illustrative embodiment 21, wherein the plurality of anatomy images comprise a first anatomy image and a second anatomy image, wherein the first anatomy image comprises voxels with a higher resolution in a first dimension that in at least a second dimension, and the second anatomy image comprises voxels with a higher resolution in the second dimension that in at least the first dimension.

Illustrative Embodiment 23: The system of illustrative embodiment 22 wherein the first dimension is an axial dimension and the second dimension is a coronal dimension.

Illustrative Embodiment 24: The system of any of illustrative embodiments 21-23, wherein the means for applying the image reconstruction process to the PET measurement data and the plurality of anatomy images comprises a means for registering the plurality of anatomy images to the PET image.

Illustrative Embodiment 25: The system of any of illustrative embodiments 21-24, wherein the means for applying the image reconstruction process to the PET measurement data and the plurality of anatomy images comprises:

a means for determining weighting values based on the plurality of anatomy images and the PET image; and a means for generating the image volume data based on the weighting values.

Illustrative Embodiment 26: The system of illustrative embodiment 25, further comprising a means for applying the weighting values to an output of a similarity function.

Illustrative Embodiment 27: The system of any of illustrative embodiments 21-26, wherein the plurality of anatomy images comprise a first Magnetic Resonance Imaging (MRI) image and a second MRI image.

Illustrative Embodiment 28: The system of illustrative embodiment 27, wherein the first MRI image includes voxels with a resolution in a first dimension that differs from a resolution in the first dimension of voxels of the second MRI image.

Illustrative Embodiment 29: The system of any of illustrative embodiments 21-28, further comprising a means for sampling volumes of each of the plurality of anatomy images to a corresponding volume of the PET image.

Illustrative Embodiment 30: The system of any of illustrative embodiments 21-29, further comprising a means for providing the image volume data for display.

The apparatuses and processes are not limited to the specific embodiments described herein. In addition, components of each apparatus and each process can be practiced independent and separate from other components and processes described herein.

The previous description of embodiments is provided to enable any person skilled in the art to practice the disclosure. The various modifications to these embodiments will be readily apparent to those skilled in the art, and the generic principles defined herein can be applied to other embodiments without the use of inventive faculty. The present disclosure is not intended to be limited to the embodiments shown herein, but is to be accorded the widest scope consistent with the principles and novel features disclosed herein.

What is claimed is:

1. A computer-implemented method, comprising:

receiving positron emission tomography (PET) measurement data and anatomy measurement data from an image scanning system, wherein the PET measurement data is generated by a PET modality and the anatomy measurement data is generated by a second modality;

generating an initial PET image based on the PET measurement data;

generating at least a first anatomy image and a second anatomy image based on the anatomy measurement data, wherein a first portion of the anatomy measurement data used for the first image has a first spatial resolution and a second portion of the anatomy measurement data used for the second anatomy image has a second spatial resolution;

registering the first anatomy image and the second anatomy image to the initial PET image to generate a first registered anatomy image and a second registered anatomy image;

reconstructing final PET image volume data by applying a multi-spatial image reconstruction process to the PET measurement data, the first registered anatomy image, and the second registered anatomy image; and storing the final PET image volume data in a data repository.

2. The computer-implemented method of claim 1, wherein the portion of the anatomy measurement data used for the first anatomy image comprises voxels with a higher resolution in a first dimension than in at least a second dimension, and the portion of the anatomy measurement data used for the second anatomy image comprises voxels with a higher resolution in the second dimension than in at least the first dimension.

3. The computer-implemented method of claim 2, wherein the first dimension is an axial dimension and the second dimension is a coronal dimension.

4. The computer-implemented method of claim 1, wherein applying the multi-spatial image reconstruction process comprises:

determining weighting values based on the first anatomy image, the second anatomy image, and the initial PET image; and generating the final PET image volume data based on the weighting values.

5. The computer-implemented method of claim 4, comprising applying the weighting values to an output of a similarity function.

6. The computer-implemented method of claim 1, wherein the first anatomy image and the second anatomy image comprise Magnetic Resonance Imaging (MRI) images.

7. The computer-implemented method of claim 6, wherein the portion of the anatomy measurement data used for the first anatomy image includes voxels with a resolution in a first dimension that differs from a resolution in the first dimension of voxels of the second anatomy image.

8. The computer-implemented method of claim 1, comprising sampling volumes of each of the first registered anatomy image and the second registered anatomy image to a corresponding volume of the initial PET image.

9. The computer-implemented method of claim 1, comprising providing the final PET image volume data for display.

10. A non-transitory computer readable medium storing instructions that, when executed by at least one processor, cause the at least one processor to perform operations comprising:

receiving positron emission tomography (PET) measurement data and anatomy measurement data from an image scanning system, wherein the PET measurement data is generated by a PET modality and the anatomy measurement data is generated by a second modality;

generating an initial PET image based on the PET measurement data;

generating at least a first anatomy image and a second anatomy image based on the anatomy measurement data, wherein a first portion of the anatomy measurement data used for the first image has a first spatial resolution and a second portion of the anatomy measurement data used for the second anatomy image has a second spatial resolution;

registering the first anatomy image and the second anatomy image to the initial PET image to generate a first registered anatomy image and a second registered anatomy image;

reconstructing final PET image volume data by applying a multi-spatial image reconstruction process to the PET measurement data, the first registered anatomy image, and the second registered anatomy image; and storing the final PET image volume data in a data repository.

11. The non-transitory computer readable medium of claim 10, wherein the portion of the anatomy measurement data used for the first anatomy image comprises voxels with a higher resolution in a first dimension than in at least a second dimension, and the portion of the anatomy measurement data used for the second anatomy image comprises voxels with a higher resolution in the second dimension than in at least the first dimension.

12. The non-transitory computer readable medium of claim 10 storing instructions that, when executed by the at least one processor, cause the at least one processor to perform operations comprising:

determining weighting values based on the first anatomy image, the second anatomy image, and the initial PET image; and generating the final PET image volume data based on the weighting values.

13. The non-transitory computer readable medium of claim 12 storing instructions that, when executed by at least one processor, further cause the at least one processor to perform operations comprising applying the weighting values to an output of a similarity function.

14. The non-transitory computer readable medium of claim 10, wherein the first anatomy image and the second anatomy image comprise Magnetic Resonance Imaging (MRI) images, and wherein the portion of the anatomy measurement data used for the first anatomy image includes voxels with a resolution in a first dimension that differs from a resolution in the first dimension of voxels of the second anatomy image.

15. A system comprising:

a data repository; and at least one processor communicatively coupled to the data repository and configured to:

receive positron emission tomography (PET) measurement data and anatomy measurement data from an image scanning system, wherein the PET measurement data is generated by a PET modality and the anatomy measurement data is generated by a second modality;

generate an initial PET image based on the PET measurement data;

generate at least a first anatomy image and a second anatomy image based on the anatomy measurement data, wherein a first portion of the anatomy measurement data used for the first image has a first spatial resolution and a second portion of the anatomy measurement data used for the second anatomy image has a second spatial resolution;

register the first anatomy image and the second anatomy image to the initial PET image to generate a first registered anatomy image and a second registered anatomy image;

reconstruct final PET image volume data by applying a multi-spatial image reconstruction process to the PET measurement data, the first registered anatomy image, and the second registered anatomy image; and store the final PET image volume data in the data repository.

16. The system of claim 15, wherein the portion of the anatomy measurement data used for the first anatomy image comprises voxels with a higher resolution in a first dimension than in at least a second dimension, and the portion of the anatomy measurement data used for the second anatomy image comprises voxels with a higher resolution in the second dimension than in at least the first dimension.

17. The system of claim 15, wherein the at least one processor is configured to:

determine weighting values based on the first anatomy image, the second anatomy image, and the initial PET image; and generate the final PET image volume data based on the weighting values.

18. The system of claim 17, wherein the at least one processor is configured to apply the weighting values to an output of a similarity function.

19. The system of claim 15, wherein the first anatomy image and the second anatomy image comprise Magnetic Resonance Imaging (MRI) images, and wherein the portion of the anatomy measurement data used for the first anatomy image includes voxels with a resolution in a first dimension that differs from a resolution in the first dimension of voxels of the second anatomy image.

20. The computer-implemented method of claim 1, wherein the multi-spatial image reconstruction process receives the initial PET image.

* * * * *